US008902326B2

(12) United States Patent
Ciuc et al.

(10) Patent No.: US 8,902,326 B2
(45) Date of Patent: Dec. 2, 2014

(54) AUTOMATIC FACE AND SKIN BEAUTIFICATION USING FACE DETECTION

(71) Applicant: DigitalOptics Corporation Europe Limited, Galway (IE)

(72) Inventors: Mihai Ciuc, Bucuresti (RO); Adrian Capata, Bucuresti (RO); Valentin Mocanu, Bucuresti (RO); Alexei Pososin, Bucuresti (RO); Corneliu Florea, Bucuresti (RO); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

(21) Appl. No.: 13/732,357

(22) Filed: Dec. 31, 2012

(65) Prior Publication Data

US 2013/0188073 A1 Jul. 25, 2013

Related U.S. Application Data

(63) Continuation of application No. 12/512,796, filed on Jul. 30, 2009, now Pat. No. 8,345,114.

(60) Provisional application No. 61/084,942, filed on Jul. 30, 2008.

(51) Int. Cl.

| | |
|---|---|
| ***H04N 5/228*** | (2006.01) |
| ***H04N 5/232*** | (2006.01) |
| ***G06T 5/00*** | (2006.01) |
| ***H04N 5/262*** | (2006.01) |
| ***G06T 11/60*** | (2006.01) |
| ***H04N 9/04*** | (2006.01) |
| ***G06K 9/00*** | (2006.01) |
| *H04N 101/00* | (2006.01) |

(52) U.S. Cl.

CPC ............ *G06T 5/002* (2013.01); *H04N 5/23229* (2013.01); *G06T 2207/30201* (2013.01); *H04N 5/2621* (2013.01); *G06T 11/60* (2013.01); *H04N 9/04* (2013.01); *H04N 2101/00* (2013.01); *G06K 9/00221* (2013.01)

USPC .................. 348/222.1; 348/223.1; 348/224.1; 348/229.1

(58) Field of Classification Search

USPC ................ 348/222.1, 223.1–229.1; 382/118, 382/254–275

See application file for complete search history.

(56) References Cited

U.S. PATENT DOCUMENTS

| | | | |
|---|---|---|---|
| 4,448,510 | A | 5/1984 | Murakoshi |
| 6,747,690 | B2 | 6/2004 | Molgaard |
| 7,082,211 | B2 | 7/2006 | Simon et al. |
| 7,099,510 | B2 | 8/2006 | Jones et al. |
| 7,212,657 | B2 | 5/2007 | Simon et a |

(Continued)

FOREIGN PATENT DOCUMENTS

| | | | |
|---|---|---|---|
| CN | 1475969 | A | 2/2004 |
| CN | 1781448 | A | 6/2006 |

(Continued)

OTHER PUBLICATIONS

Final Rejection, dated Jun. 3, 2013, for U.S. Appl. No. 12/512,843, filed Jul. 30, 2009.

(Continued)

*Primary Examiner* — Yogesh Aggarwal

(57) ABSTRACT

Sub-regions within a face image are identified to be enhanced by applying a localized smoothing kernel to luminance data corresponding to the sub-regions of the face image. An enhanced face image is generated including an enhanced version of the face that includes certain original pixels in combination with pixels corresponding to the one or more enhanced sub-regions of the face.

18 Claims, 2 Drawing Sheets

(56) References Cited

U.S. PATENT DOCUMENTS

| | | | | |
|---|---|---|---|---|
| 7,317,815 | B2 | 1/2008 | Steinberg et al. | |
| 7,336,810 | B2 | 2/2008 | Fujii et al. | |
| 7,460,705 | B2 * | 12/2008 | Nagahashi et al. | 382/165 |
| 7,657,086 | B2 * | 2/2010 | Gu | 382/159 |
| 8,345,114 | B2 | 1/2013 | Ciuc et al. | |
| 8,384,793 | B2 | 2/2013 | Ciuc et al. | |
| 2001/0022853 | A1 | 9/2001 | Takaoka | |
| 2002/0081003 | A1 | 6/2002 | Sobol | |
| 2002/0102024 | A1 | 8/2002 | Jones et al. | |
| 2003/0223622 | A1 | 12/2003 | Simon et al. | |
| 2005/0141778 | A1 | 6/2005 | Nakajima et al. | |
| 2006/0039690 | A1 | 2/2006 | Steinberg et al. | |
| 2006/0098867 | A1 | 5/2006 | Gallagher | |
| 2006/0228037 | A1 | 10/2006 | Simon et al. | |
| 2007/0110305 | A1 | 5/2007 | Corcoran et al. | |
| 2007/0189609 | A1 | 8/2007 | Ito et al. | |
| 2007/0189627 | A1 | 8/2007 | Cohen et al. | |
| 2007/0196019 | A1 | 8/2007 | Yamaguchi | |
| 2008/0187184 | A1 * | 8/2008 | Yen | 382/118 |
| 2008/0253651 | A1 | 10/2008 | Sagawa | |
| 2008/0267443 | A1 | 10/2008 | Aarabi | |
| 2008/0298704 | A1 | 12/2008 | Nachlieli et al. | |
| 2010/0026831 | A1 | 2/2010 | Ciuc et al. | |
| 2010/0026832 | A1 | 2/2010 | Ciuc et al. | |
| 2010/0026833 | A1 | 2/2010 | Ciuc et al. | |
| 2011/0002506 | A1 | 1/2011 | Ciuc et al. | |
| 2011/0158547 | A1 | 6/2011 | Petrescu et al. | |
| 2012/0019683 | A1 | 1/2012 | Susanu et al. | |
| 2013/0229549 | A1 | 9/2013 | Ciuc et al. | |

FOREIGN PATENT DOCUMENTS

| | | | |
|---|---|---|---|
| EP | 1441497 | A2 | 7/2004 |
| EP | 1453002 | A2 | 9/2004 |
| JP | 2004-265406 | A | 9/2004 |
| JP | 2004-303193 | A | 10/2004 |
| JP | 2005-196270 | A | 7/2005 |
| JP | 2006-018467 | A | 1/2006 |
| JP | 2006-072770 | A | 3/2006 |
| KR | 20070034966 | A | 3/2007 |
| WO | 00/76398 | A1 | 12/2000 |
| WO | 2006/087581 | A1 | 8/2006 |
| WO | 2007/128117 | A1 | 11/2007 |
| WO | 2010/012448 | A2 | 2/2010 |
| WO | 2010/012448 | A3 | 6/2010 |
| WO | 2012/000800 | A1 | 1/2012 |

OTHER PUBLICATIONS

Patent Abstracts of Japan, publication No. 2004-265406, publication date: Sep. 24, 2004, for Method and System for Improving Portrait Image Processed in Batch Mode.

Patent Abstracts of Japan, publication No. 2006-018467, publication date: Jan. 19, 2006, for Image Processing Apparatus and Image Processing Method.

Patent Abstracts of Japan, publication No. 2004-303193, publication date: Oct. 28, 2004, for: Image Processor.

Patent Abstracts of Japan, publication No. 2005-196270, publication date: Jul. 21, 2005, for Image Processing Method, Image Processing Equipment, and Image Processing Program.

Non-Final Rejection, dated Aug. 1, 2013, for U.S. Appl. No. 13/776,694, filed Feb. 25, 2013.

R. Valenti, T. Gevers, Accurate eye center location through invariant isocentric patterns, IEEE Trans. PAMI 34 (9) (2012) 1785-1798.

Li Bai, Linlin Shen, and Yan Wang: A Novel Eye Location Algorithm based on Radial Symmetry Transform. In Proceedings of the 18th International Conference on Pattern Recognition (ICPR '06), 2006, vol. 3. IEEE Computer Society, Washington, DC, USA, pp. 511-514. ISBN:0-7695-2521-0, DOI=10.1109/ICPR.2006.136, http://dx.doi.org/10.1109/ICPR.2006.136.

Fabian Timm and Erhardt Barth, Accurate Eye Centre Localisation by Means of Gradients, In Proceedings of VISAPP. 2011, pp. 125-130.

Changhyung Lee, Morgan T. Schramm, Mireille Boutin and Jan P. Allebach, Automatic eye enhancement by sclera whitening, Proc. SPIE, vol. 7540, Feb. 10, 2010, pp. 1-7, XP040516098.

Dan Witzner Hansen and Qiang Ji, In the Eye of the Beholder: A Survey of Models for Eyes and Gaze, published by the IEEE Computer Society, IEEE Transactions on Pattern Analysis and Machine Intelligence, vol. 32, No. 3, Mar. 2010, pp. 478-500.

Paul Viola, Michael Jones: "Rapid Object Detection using a Boosted Cascade of Simple Features", IEEE, 2001, pp. I-511-I-518.

Paul Viola, Michael J. Jones: "Robust Real-Time Face Detection", International Journal of Computer Vision, vol. 57, Issue 2, May 2004, pp. 137-154.

Zhou Wang, Alan Conrad Bovik, Hamid Rahim Sheikh, and Eero P. Simoncelli, Image Quality Assessment: From Error Visibility to Structural Similarity, IEEE Transactions on Image Processing, vol. 13, No. 4, Apr. 2004, pp. 600-612.

Notice of Allowance, dated Dec. 5, 2012, for U.S. Appl. No. 12/512,819, filed Jul. 30, 2009.

Notice of Allowance, dated Jan. 2, 2013, for U.S. Appl. No. 12/512,819, filed Jul. 30, 2009.

Final Rejection, dated Aug. 2, 2012, for U.S. Appl. No. 12/512,819, filed Jul. 30, 2009.

Non-Final Rejection, dated Nov. 21, 2011, for U.S. Appl. No. 12/512,819, filed Jul. 30, 2009.

Final Rejection, dated Aug. 2, 2012, for U.S. Appl. No. 12/512,843, filed Jul. 30, 2009.

Non-Final Rejection, dated Dec. 7, 2012, for U.S. Appl. No. 12/512,843, filed Jul. 30, 2009.

Yao, Christina: "Image Cosmetics: An automatic Skin Exfoliation Framework on Static Images" UCSB Four Eyes Lab Imaging, Interaction, and Innovative Interfaces Publications Thesis, Master of Science in Media Arts and Technology Dec. 2005, pp. I-83, XP002575131 University of California Retrieved from the Internet: URL:http://ilab.cs.ucsb.edu/publications/YaoMS.pdf> [retrieved on Mar. 25, 2010].

Non-Final Rejection, dated Nov. 25, 2011, for U.S. Appl. No. 12/512,796, filed Jul. 30, 2009.

Notice of Allowance, dated Jul. 18, 2012, for U.S. Appl. No. 12/512,796, filed Jul. 30, 2009.

PCT Notification of Transmittal of the International Search Report and the Written Opinion of the International Searching Authority, or the Declaration, for PCT Application No. PCT/EP2009/005461, dated Apr. 20, 2010, 12 pages.

PCT Notification Concerning Transmittal of International Preliminary Report on Patentability, Chapter I, for PCT Application No. PCT/EP2009/005461, dated Feb. 1, 2011, 9 pages.

Josh Harguess, J. K. Aggarwal: "A case for the average-half-face in 2D and 3D for face recognition" Computer Vision and Pattern Recognition Workshops, 2009. CVPR Workshops 2009. IEEE Computer Society Conference on, IEEE, Piscataway, NJ, USA, Jun. 20, 2009, pp. 7-12, XP031512342, ISBN: 978-1-4244-3994-2.

Jian Sun, Yin Li, Sing Bing Kang, Heung-Yeung Shum: "Flash Matting" ACM Transactions on Graphics, vol. 25, No. 3, Jul. 31, 2006, pp. 772-778, XP002398969, DOI: http://dx.doi.org/10.1145/1141911.1141954.

Patent Abstracts of Japan, for publication No. JP 2006-072770, published Mar. 16, 2006, Face Detection Device and Face Direction Estimation Device, 1 page.

Non-Final Rejection, dated Jan. 10, 2013, for U.S. Appl. No. 12/825,280, filed Jun. 28, 2010.

PCT Notification of the Transmittal of the International Search Report and the Written Opinion of the International Searching Authority, or the Declaration, for PCT Application No. PCT/EP2011/060013, dated Sep. 8, 2011, 12 Pages.

PCT Notification of Transmittal of International Preliminary Report on Patentability Chapter I, International Preliminary Report on Patentability, Chapter I of the Patent Cooperation Treaty, for PCT Application No. PCT/EP2011/060013, report dated Jan. 8, 2013, 9 Pages.

Korean Intellectual Property Office, "Notice of Non-Final Rejection", in application No. 10-2010-7025740, dated Dec. 27, 2013, 6 pages.

Current Claims in application No. 10-2010-7025740, dated Dec. 2013, 4 pages.

* cited by examiner

FIGURE 1A

FIGURE 1B: after applying selective smoothing/blur

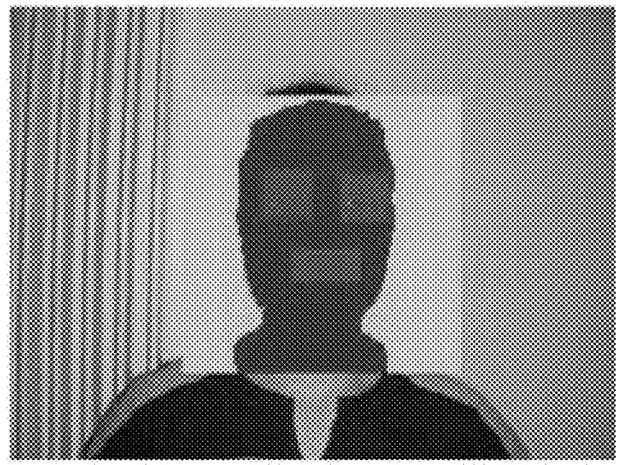
Figure 2A
Figure 2B
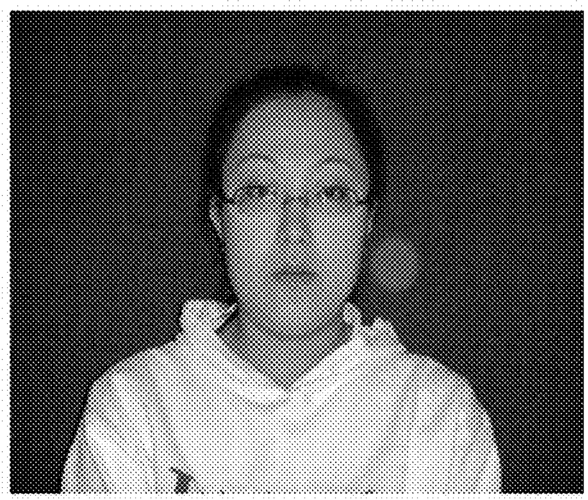
Figure 2C

AUTOMATIC FACE AND SKIN BEAUTIFICATION USING FACE DETECTION

PRIORITY AND RELATED APPLICATIONS

This application is a continuation application that claims the benefit of priority to U.S. patent application Ser. No. 12/512,796, filed Jul. 30, 2009, now U.S. Pat. No. 8,345,114; which claims priority to U.S. provisional patent application No. 60/084,942, filed Jul. 30, 2008, which are incorporated by reference. The '796 application is one of three applications filed contemporaneously by these same inventors.

BACKGROUND

1. Field of Invention

The invention relates to image processing, particularly of detected sub-regions within face images.

2. Description of the Related Art

Proctor and Gamble's U.S. Pat. No. 6,571,003 mentions finding and fixing facial defects such as spots, wrinkles, pores, and texture in sub-regions of faces, e.g, cheeks or in areas defined by landmark points such as corner or nose, eye, or mouth. The technique involves replacing the defined region with a mask. The P&G patent discloses to electronically alter the color.

The P&G patent also mentions detecting and correcting lighting gradients and lighting variances. These lighting gradients, or variances, appear to involve instances where there is directional lighting which may cause a sheen or brighter region on the facial skin. U.S. patent applications Ser. Nos. 12/038,147, 61/106,910 and 61/221,425, which are assigned to the same assignee as the present application and are hereby incorporated by reference, describe techniques which use Viola-Jones type classifier cascades to detect directional lighting. However, determining and correcting a lighting gradient would typically involve global analysis, exceptions being possible in combination with face-tracking techniques such as those described at U.S. patents Ser. Nos. 7,403,643 and 7,315,631 and U.S. applications Ser. Nos. 11/766,674, published as 2008/0037840, and U.S. Ser. Nos. 12/063,089, 61/120,289, and 12/479.593, which are all assigned to the same assignee as the present application and are hereby incorporated by reference. It is desired to have a technique that uses a local blurring kernel rather than such techniques involving less efficient global analysis for certain applications and/or under certain conditions, environments or constraints.

Kodak's U.S. Pat. No. 7,212,657 illustrates at FIGS. 13-14 to generate a shadow/peak image (based on generating a luminance image and an average luminance image), a blur image, and blended images. The Kodak patent states that a shadow/highlight strength image is generated by subtracting an average luminance image from a luminance image. Also, at FIG. 16, the Kodak patent shows element 1530 is labeled as "generate luminance and chrominance scaling factors using peak/valley map and color info", and element 1540 is labeled as "modify luminance and chrominance of pixels within mask regions". Face detection is described in the Kodak patent, but not face tracking.

The Kodak technique, like the P&G technique, involves global image manipulations, i.e., the "luminance image" is not indicated as including anything less than the entire image, the "blur image" involves the application of a kernel to the entire image, and the "blended image" involves three copies of the global image. The "blur image" involves chrominance and luminance data meaning that a lot of memory is used for manipulating the image, particularly if the application involves a resource constrained embedded system. Regarding luminance and chrominance scaling factors, even if they involve localized scaling factors, they are not described in the Kodak patent as being generated for application to anything less than the entire image.

U.S. patent application Ser. Nos. 11/856,721 and 12/330,719, which are assigned to the same assignee as the present application and are hereby incorporated by reference, describes a technique that can be applied as a single, raster-like, scan across relevant regions of an image without involving global analysis or a determination of global properties such as the average luminance image, or a shadow or blur image. Such single-pass scan through predetermined regions provides a far more efficient and suitable technique for embedded systems such as digital cameras than either of the P&G or Kodak patents.

The Hewlett Packard (HP) published patent application 2002/0081003 mentions air-brushing which typically involves applying color over a swath of an image, e.g., such as may include a blemish or wrinkle. The HP publication also mentions blurring over a wrinkle on an image of a person's face, and again specifically describes blurring or blending color values defining the wrinkles and surrounding skin. The HP application mentions changing brightness to brighten or darken a facial feature, such as to shade a facial feature, and goes on to describe changing color values of skin associated with the feature to shade the feature. The HP patent further discloses to sharpen a hair line and/or blur a forehead and/or cheeks, by blurring color values. Face detection and face tracking over multiple images, full resolution or low resolution and/or subsample reference images such as previews, postviews and/or reference images captured with a separate imaging system before, during or after capturing of a main full-resolution image are not described in the HP patent, nor is there any suggestions to smooth or blur luminance data of a digital face image.

Portrait is one of the most popular scenes in digital photography. Image retouching on portrait images is a desirable component of an image processing system. Users can spend a lot of time with conventional software trying to make a portrait nicer by hiding wrinkles and blemishes. It is desired to provide an innovative automatic portrait scene enhancer, which is suitable for an embedded device, such as a digital still camera, camera-phone, or other handheld or otherwise portable consumer appliance having image acquisition components (e.g., lens, image sensor) and a processor.

SUMMARY OF THE INVENTION

A method is provided for enhancing an appearance of a face within a digital image using a processor. An image is acquired of a scene including a face. The face is identified within the digital image. One or more sub-regions to be enhanced with localized luminance smoothing are identified within the face. One or more localized luminance smoothing kernels are applied each to one of the one or more sub-regions identified within the face to produce one or more enhanced sub-regions of the face. The one or more localized smoothing kernels are applied to luminance data of the one or more sub-regions identified within the face. An enhanced image is generated including an enhanced version of the face including certain original pixels in combination with pixels corresponding to the one or more enhanced sub-regions of the face. The enhanced image and/or a further processed version is displayed, transmitted, communicated and/or digitally stored and/or otherwise output.

The localized luminance smoothing may include blurring or averaging luminance data, or a combination thereof.

One or more localized color smoothing kernels may be applied to the one or more sub-regions. The one or more enhanced sub-regions of the corrected image may also include pixels modified from original or otherwise processed pixels of the face at least by localized color smoothing.

Noise reduction and/or enhancement may be applied to the one or more sub-regions. The one or more enhanced sub-regions of the corrected image may also include pixels modified from original or otherwise processed pixels of the face at least by localized noise reduction and/or enhancement.

Certain non-skin tone pixels within the one or more sub-regions of the face may be determined not to have a threshold skin tone. These non-skin tone pixels may be removed, replaced, reduced in intensity, and/or modified in color.

Enhanced pixels of the one or more enhanced sub-regions may include enhanced intensities which comprise one or more functions of a relationship between original pixel intensities and local average intensities within the one or more original and/or enhanced sub-regions.

One or more mouth and/or eye regions may be detected within the face. A natural color of one or more sub-regions within the one or more mouth and/or eye regions may be identified and enhanced. These sub-regions may include one or more teeth, lips, tongues, eye whites, eye brows, iris's, eye lashes, and/or pupils.

The face may be classified according to its age based on comparing one or more default image attribute values with one or more determined values. One or more camera acquisition and/or post-processing parameters may be adjusted based on the classifying of the face according to its age.

A digital image acquisition device is also provided, including a lens, an image sensor and a processor, and a processor-readable memory having embodied therein processor-readable code for programming the processor to perform any of the methods described herein, particularly for enhancing an appearance of a face or other feature within a digital image.

One or more processor-readable media are also provided that have embodied therein code for programming one or more processors to perform any of the methods described herein.

In certain embodiments, face tracking using previews, postviews or other reference images, taken with a same or separate imaging system as a main full resolution image is combined with face beautification. This involves smoothing and/or blurring of face features or face regions, wrinkle/blemish removal, or other digital cosmetic adjustments. In certain embodiments, a luminance channel is used for smoothing an unsightly feature, while in a narrow subset of these, only the luminance channel is used for smoothing without using any color channel. Other embodiments used one or more color channels in addition to the luminance channel, and these may or may not also use face tracking.

In certain embodiments, localized modification of a region of a face is performed based on an average of the pixel values surrounding a particular pixel. This localized averaging/blurring kernel may be applied solely on the luminance channel, thereby reducing computation in an embedded system such as a portable digital camera, camera-phone, camera-equipped handheld computing device, etc.

A single-pass filtering kernel may be configured to act only on local luminance values within pre-determined regions of the image, and may be combined with a binary skin map. This is far more efficient, using less memory and executing more quickly, within an embedded imaging system such as a digital camera.

Blurring or shading may be achieved by changing selected luminance values of one or more sub-regions of a face. An embodiment involves applying or subtracting luminance over a swath of an image, e.g., such as may include a blemish or wrinkle. Blurring may also be applied to a facial feature region that includes a wrinkle on an image of a person's face. Blurring and/or blending luminance values of a face feature region, e.g., temple region, side of nose, forehead, chin, cheek region) defining the wrinkles and surrounding skin. Brightness may be changed to brighten or darken a facial feature, such as to shade a facial feature, and this may be achieved by changing luminance values of skin associated with the feature to shade or brighten the feature.

In certain embodiment, a technique is provided including in-camera processing of a still image including one or more faces as part of an acquisition process. The technique includes identifying a group of pixels including a face within a digitally-acquired still image on a portable camera. One or more first processing portions of the image is determined including the group of pixels (the first portion may be characterized as foreground). One or more second processing portions of the image other than the group of pixels is then determined (and may be characterized as background). The technique may include automatically in-camera processing the first processing portion with a determined level of smoothing, blurring, noise reduction or enhancement, or other skin enhancement technique involving one or more luminance components of the pixels, while applying substantially less or no smoothing, blurring, noise reduction or enhancement or otherwise to the second processing portion to generate a processed image including the face. The processed image or a further processed version including the face is then stored, displayed, transmitted, communicated, projected or otherwise controlled or output such as to a printer, display other computing device, or other digital rendering device for viewing the in-camera processed image. The method may include generating in-camera, capturing or otherwise obtaining in-camera a collection of low resolution images including the face, and determining the first processing portion including analyzing the collection of low resolution images. The analyzing may include tracking the face within the collection of low resolution images.

A further method is provided for enhancing an appearance of a face within a digital image. A digital image of a scene including a face is acquired using a processor. The image is captured using a lens and an image sensor, and/or the image is received following capture by a device that includes a lens and an image sensor. The face is identified within the digital image. Skin tone portions of the face are segmented from face features including one or two eyes or a mouth or combinations thereof. Within the skin tone portions of the face, one or more blemish regions that vary in luminance at least a threshold amount from non-blemished skin tone portions are identified. Luminance data of the one or more blemish regions is smoothed to generate smoothed luminance data. An enhanced image is generated including an enhanced version of the face that has original luminance data of the one or more blemish regions replaced with the smoothed luminance data and combined with original non-blemished skin tone portions. The enhanced image and/or a further processed version is/are displayed, transmitted, communicated, digitally stored and/or otherwise output.

The localized luminance smoothing may include blurring and/or averaging luminance data.

The method may include applying one or more localized color smoothing kernels to the one or more sub-regions. The one or more enhanced sub-regions of the corrected image further may include pixels modified from original pixels of the face at least by localized color smoothing.

The method may include applying noise reduction or enhancement, or both, to the one or more sub-regions. The one or more enhanced sub-regions of the corrected image may include pixels modified from original pixels of the face at least by localized noise reduction and/or enhancement.

The method may include determining certain non-skin tone pixels within the one or more sub-regions that do not comprise a threshold skin tone, and removing, replacing, reducing an intensity of, or modifying a color of said certain non-skin tone pixels, or combinations thereof.

Enhanced pixels of the one or more enhanced sub-regions may include enhanced intensities which comprise one or more functions of a relationship between original pixel intensities and local average intensities within the one or more original and/or enhanced sub-regions.

The method may include detecting one or more mouth and/or eye regions within the face, and identifying and enhancing a natural color of one or more sub-regions within the one or more mouth or eye regions, including one or more teeth, lips, tongues, eye whites, eye brows, iris's, eye lashes, or pupils, or combinations thereof.

A further method is provided for enhancing an appearance of a face within a digital image. A processor is used to generate in-camera, capture or otherwise obtain in-camera a collection of one or more relatively low resolution images including a face. The face is identified within the one or more relatively low resolution images. Skin tone portions of the face are segmented from face features including one or two eyes or a mouth or combinations thereof. Within the skin tone portions of the face, one or more blemish regions are identified that vary in luminance at least a threshold amount from the skin tone portions. A main image is acquired that has a higher resolution than the one or more relatively low resolution images. The main image is captured using a lens and an image sensor, or received following capture by a device that includes a lens and an image sensor, or a combination thereof. The method further includes smoothing certain original data of one or more regions of the main image that correspond to the same one or more blemish regions identified in the relatively low resolution images to generate smoothed data for those one or more regions of the main image. An enhanced version of the main image includes an enhanced version of the face and has the certain original data of the one or more regions corresponding to one or more blemish regions replaced with the smoothed data. The enhanced image and/or a further processed version is/are displayed, transmitted, communicated and/or digitally stored or otherwise output.

The method may include tracking the face within a collection of relatively low resolution images.

The smoothing may include applying one or more localized luminance smoothing kernels each to one of the one or more sub-regions identified within the face to produce one or more enhanced sub-regions of the face. The one or more localized luminance smoothing kernels may be applied to luminance data of the one or more sub-regions identified within said face. The localized luminance smoothing may include blurring and/or averaging luminance data. The method may also include applying one or more localized color smoothing kernels to the one or more sub-regions. The one or more enhanced sub-regions of the corrected image may include pixels modified from original pixels of the face at least by localized color smoothing.

The method may also include applying noise reduction and/or enhancement to the one or more sub-regions. The one or more enhanced sub-regions of the corrected image may include pixels modified from original pixels of the face at least by localized noise reduction and/or enhancement.

Certain non-skin tone pixels may be determined within the one or more sub-regions that do not comprise a threshold skin tone. The method may include removing, replacing, reducing an intensity of, and/or modifying a color of such non-skin tone pixels.

Enhanced pixels of the one or more enhanced sub-regions may include enhanced intensities which have one or more functions of a relationship between original pixel intensities and local average intensities within the one or more original and/or enhanced sub-regions.

One or more mouth and/or eye regions may be detected within the face. A natural color may be identified and enhanced for one or more sub-regions within the one or more mouth and/or eye regions, including one or more teeth, lips, tongues, eye whites, eye brows, iris's, eye lashes, and/or pupils.

BRIEF DESCRIPTION OF THE DRAWINGS

FIG. 1A-1B illustrate unprocessed and processed images of a face, where the processing involves applying selective smoothing or blur to regions of the face.

FIGS. 2A-2C illustrate identification of regions of a face, and processed and unprocessed version of a face image, wherein the processing involves application of selective smoothing or blurring of certain regions of the face.

DETAILED DESCRIPTION OF THE EMBODIMENTS

Using at least one reference image, and in certain embodiments more than one reference image, including a face region, the face region is detected. In those embodiments wherein multiple reference images are used, a face region is preferably tracked. Face detection and tracking are performed preferably in accordance with one or more techniques described in the US patents and US patent applications listed above and below and which are incorporated by reference here.

Figures 1A, 1B:
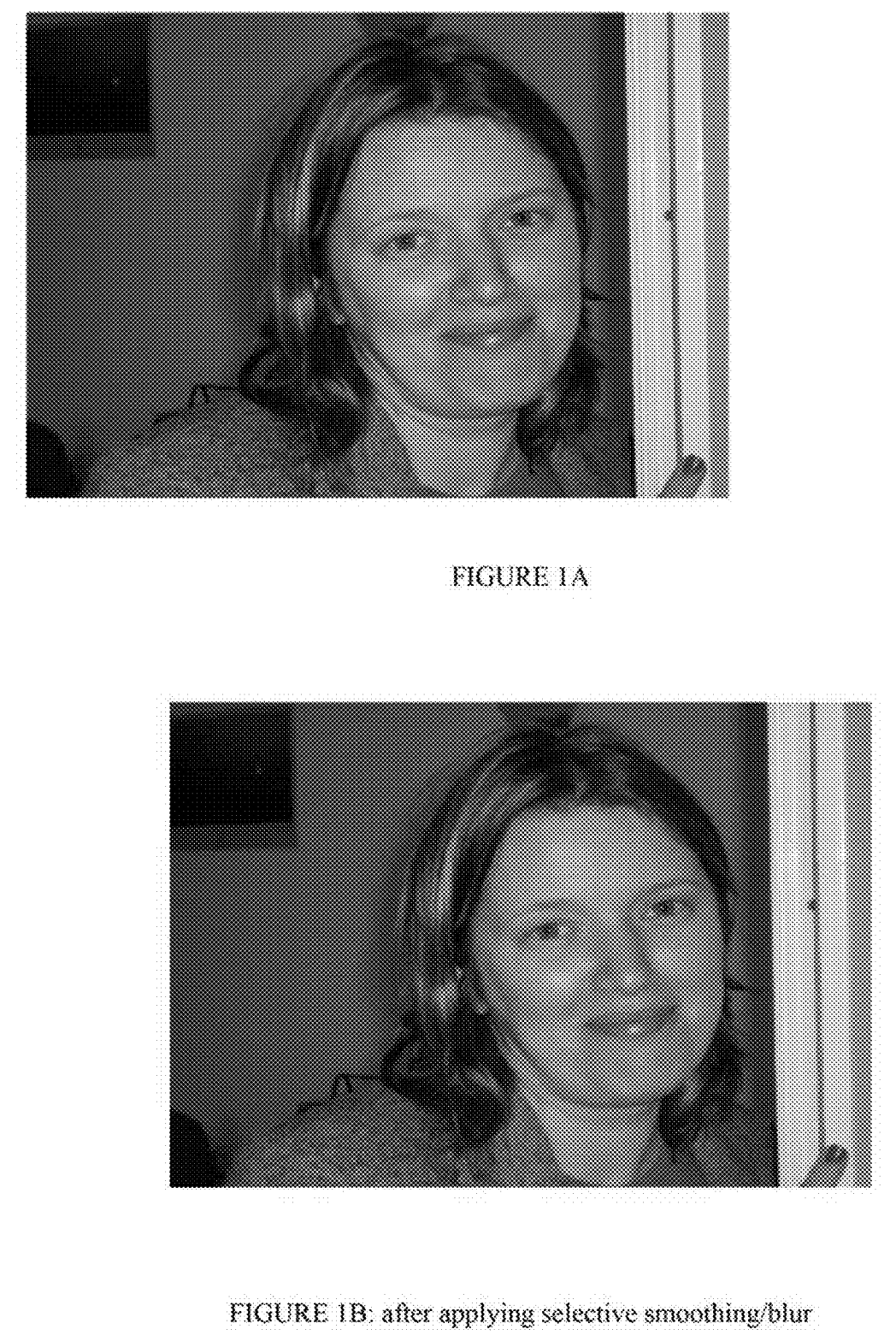

Given an input image and one or more, preferably two or more, smaller, subsampled, and/or reduced resolution versions of the input image (e.g., one QVGA and one XGA), the position of a face and of the eyes of the face within the input image are determined using face detection and preferably face tracking. FIG. 1A shows an example of an unprocessed image including a face, or at least an image of a face with original image data or image data that has been otherwise processed than by selective localized smoothing or blurring such as is described with reference to embodiments herein. The face beautification method applies a selective blur, and/or other smoothing such as localized averaging or according to one or more of the methods specifically described below, which enhances the skin, e.g., softening and/or reducing wrinkles and/or spots. FIG. 1A illustrates an unprocessed image of a face before applying selective smoothing. FIG. 1B illustrates a processed version of the image of the face of FIG. 1A, i.e., after applying selective smoothing to certain sub-regions of the face.

In an exemplary embodiment, the method may be performed as follows. Certain sub-regions of the face are identified, e.g., rectangular sub-regions or other polygonal or curved or partially-curved sub-regions with or without one or more cusps or otherwise abrupt segmental intersections or discontinuities. These sub-regions may be places where it will be desired to apply selective smoothing, or these sub-regions may be those places outside of which it is desired to apply the selective smoothing, or a combination of these. For example, three sub-regions such as two eyes and a mouth may be identified for not applying selective smoothing, and/or four sub-regions such as a forehead, two cheeks and a chin may be specifically selected for applying localized luminance smoothing.

Now, in the embodiment where the two eye and mouth are identified, the skin around these facial sub-regions/rectangles is detected. This can include in certain embodiments creating a binary skin image, including segmenting the QVGA version of the image. In one embodiment, this involves thresholding done in YCbCr.

A larger rectangle or other shape may be defined around the face as a whole. That is, outside of this larger facial shape, it may be desired in most embodiments herein not to apply the selective smoothing (although there may be other reasons to smooth or blur a background or other region around a detected face in a digital image, such as to blur a background region in order to highlight a face in the foreground; see, e.g., U.S. Pat. Nos. 7,469,071 and 12/253,839, which are assigned to the same assignee and are hereby incorporated by reference). A skin map may be filtered by morphological operations. The largest regions inside the face may be selected to be kept, and regions may be selected based on other criteria such as overall luminance, a certain threshold luminance contrast such as may be indicative of wrinkled skin, a color qualification such as a certain amount of red, a spotty texture, or another unsatisfactory characteristic of a region or sub-region of a face. Lip detection may be performed based on color information (Cr component) and/or on the position of the eyes, nose and/or ears or other face feature such as chin, cheeks, nose, facial hair, hair on top of head, or neck, and/or on a shape detector designed for specifically detecting lips.

The skin inside of one or more face regions, not including the eye and mouth regions, is corrected. In certain embodiments this involves skin pixels from inside a face region having their luminance component replaced with different luminance values, such as an average value of its neighbors, e.g., substantially all or a fair sampling of surrounding skin pixels, or all of a majority of pixels from one direction as if the pixels were being replaced by blurred pixels caused by relative camera-object movement in a certain direction. Smoothing can include an averaging process of skin pixels from other regions of the face, and/or can be a calculation other than averaging such as to prioritize certain pixels over others. The prioritized pixels may be closest to the pixel being replaced or may have a color and/or luminance with greater correlation to a preferred skin tone.

Certain criteria may be applied as requirement(s) for correcting a region within an image. For example, it may be set as requisite that the region be inside a face, although alternatively the skin of a person's neck, leg, arm, chest or other region may be corrected. It may be set as requisite that the luminance component be within a certain range. That range may depend on an average luminance of the skin within the certain face or a preferred luminance or a selected luminance. The certain pixel may be selected or not selected depending on its relation with other details within the face (e.g., eyes, nose, lips, ears, hair, etc.). The number of neighbors used when modifying the current pixel (i.e., the kernel size) may be varied depending on the size of the face versus the size of the image, or on a standard deviation of luminance values, and/or other factors may be taken into account such as the resolution or a determination as to how much fixing the particular face region or sub-region ought to receive. If the face is too small compared to the image (e.g., the face uses below a threshold percentage of the available pixel area, then the system can be set to apply no correction of wrinkles, spots, etc., because such undesired features may not be visible anyway. The averaging or other smoothing or blurring may be done on a XGA image in order to improve speed.

Localized Blurring/Smoothing Kernel(s)

The blurring kernel or smoothing kernel in certain embodiments may be changed, adjusted, selected, and/or configured based on one or more factors specific to the image and/or group of images based upon which a corrected image is to be generated. A factor may be relative size of the facial image to that of the main picture. Other factors may include resolution of the face region and/or the entire image, processing capacity and/or RAM or ROM capacity, and/or display, projection or transmission capacity of an embedded device or processing or rendering environment with which the image is acquired, processed and/or output.

The blurring kernel may include a table, formula, calculation and/or plot of face sizes (e.g., 5% of image, 10% of image, 20% of image, etc) versus kernel sizes (e.g., 3×3, 4×4, 5×5, etc.) The kernel may also be adjusted based the relative location of the sub-region within a face. The kernel applied to the cheeks may be configured to blur cheeks effectively, while a different kernel to apply to the skin around the eyes may be configured to blur/smooth that skin most effectively, same for the skin in the forehead, the skin around the mouth/chin, etc. A different kernel can be applied to a bearded region or other hair region or no smoothing may be applied to such regions. In a specific, simple example embodiment, the blurring/smoothing kernel is smaller when faces are smaller (two or more levels or one or more thresholds may be used). The blurring kernel may decrease working around eyes or lips or nose or bearded regions or low luminance regions or dark colored regions. The blurring kernel may depend on average luminance around the point of interest.

The method in certain embodiments may include the application of selective skin enhancement and/or noise removal. This provides an alternative approach to determining the facial regions when a beautification filter or blurring/smoothing kernel might not be applied.

An Alternative Implementation: Lee-Based Filtering

A face beautifier may use certain relevant data gathered in a face tracking technique as described in reference cited herein and incorporated by reference (see below). That information may include a position of the face and/or a feature within the face such as one or both eyes, mouth or nose, information relating to where skin is detected and its tone, luminance, shaded areas, direction relative to incoming light, etc. That data can also include the Cb,Cr,Y range within the face area, and/or backlighting image information.

Application to Luminance Channel

The technique according to certain embodiments may employ modifications of the luminance channel to achieve the filtering of the skin. Data relating to variance within the luminance channel may also be used, and texture information of the skin of the face region or sub-region may be used. Such texture information may include certain chrominance data, but may also include only luminance data which defines such texture within the image. The variance on luminance may be utilized when selecting and/or performing blurring/smoothing, and may be applied specifically to separating wrinkles (which are typically rather isolated) from the texture of the face of a shaved man or even an unshaved man (where variance is high). The texture information may involve a measure of to what degree areas or sub-regions are uniform or not. The texture information may include a recognized or learned or newly-analyzed pattern, which can be analyzed either on the luminance channel only and/or also on one or more color channels.

In certain embodiments, only face and eyes may be mandatory, while in others certain other features may be required. Face tracking may be used but is not required for the technique to provide tremendous advantage in beautifying a face. The location of a face within an image may be gathered using face detection only or using face tracking. A dynamic skin-map and/or contrast info may be gathered using face tracking.

Within a digital camera or real-time imaging appliance, a real-time face tracking subsystem (operable on a sequence of preview, postview or other reference images independent of the main image) may be operated, and on acquisition of a main image, facial enhancements may be performed based on (i) an analysis of the facial region in the main acquired image and (ii) an analysis of face region metadata determined from the real-time face tracking subsystem.

Facial Image Enhancement

Apart from the image to be enhanced, the algorithm may use (if available) extra information, including the position of the face(s) and eyes in the given image which will help limiting the area of search, and two resized copies of the initial image (e.g.: one QVGA and one XGA). These two images may be used for faster processing power where accuracy is less critical.

An example algorithm according to certain embodiments may be described as follows:

Enhancement Map Detection

Based on face information, skin tones similar to those inside a face rectangle are sought in the entire image. In detail, for each face passed, the steps may be as follows in one example embodiment (not necessarily in the order discussed below):

Compute the average saturation for the region of interest (entire face rectangle or other shape in this case). To avoid problems in cases such as side illumination, the average saturation for the entire image may also computed and the minimum between the two may be used.

The relevant skin tone information (from the face rectangle) is extracted. This is done by geometrical considerations (and additionally by color filtering). In one implementation this means: top, left and right of the rectangle are changed in such a way that ⅕ of each side is not taken into account. Bottom (based on image orientation) stays the same or not depending on whether it is deemed important to have the neck included. One implementation of color filtering may be the elimination or reduction of luminance or change of color of pixels which are determined to have non-skin tones (e.g. blue pixels).

PCA (Principal Component Analysis) procedure may be applied on remaining pixels. A pixel may be given by a triplet. The covariance matrix of the given pixels is computed. The eigenvectors and eigenvalues of the covariance matrix are then found. The three resulting eigenvectors represent the axes of a new 3D coordinate system. The two least important axes (corresponding to the two smallest eigenvalues) are further considered.

The coordinates of all inspected pixels on the two above-mentioned axes are computed. The two histograms of the absolute value of the coordinates are then computed: one histogram for each axis. For each of the two histograms, an acceptance threshold may be determined, for example, using the following procedure. The corresponding cumulative histogram H is computed. The threshold is taken such as to delimit a given percentage of the total number of pixels (i.e., threshold Th is taken such as H(Th)~=p %, with p being a predefined value). By choosing different values for p one can vary the strength of the skin filtering. For example values taken for p may vary from 90.0% (for strong filtering) up to 97.5% (for permissive filtering).

Compute the coordinates of each image pixel on the two axes resulting after the PCA step and check if the absolute values are smaller than the thresholds obtained in the previous step.

For a pixel to be considered skin type further verification may be done. An example is to check that saturation is large enough in the YUV color space. Based on the average saturation computed in the first stage, each pixel may be verified to have at least one of the U and V values large enough. Also the luminance level of the pixel is checked to be in a predefined gamut. This is because we do not want to beautify dark hair or too bright areas where color information is not reliable.

In the same time a generic skin detection algorithm (e.g. simple thresholding on the YUV space) may be applied on the entire image to obtain a less reliable but more inclusive skin map. The role of the generic skin map may be manifold, as it may replace the PCA skin map in cases where face information is not present. The skin map may also used to improve the PCA skin map by helping in deciding if holes in the map are going to be filled. The skin map may add up to the PCA skin map "uncertain skin pixels", or pixels with a lower confidence which are to be treated separately by the correction block.

The skin map may now be cleaned up by applying spatial filtering such as morphological operations. At this point the skin map may have two levels of confidence: PCA skin (high confidence) and uncertain skin (low confidence). The number of levels of confidence may be further increased by taking into consideration the spatial positioning of a skin pixel inside the skin area. In one implementation, the closer one pixel is to the interior of the map, the higher its confidence is set. In another implementation, the number of skin confidence levels could be increased from the PCA thresholding stage by using multiple thresholding of pixel coefficients on the PCA axes.

Enhancement Map Correction

The skin pixels from inside the faces (or the ones from regions that passed skin filtering when no face is present) are corrected. An example process for performing this correction is described below.

A weight $\alpha \in [0,1]_\alpha$ may be computed for each pixel describing how much correction it will receive. The higher the value of $\alpha$, the more correction will be applied to that pixel. The weight may be based on the local standard-deviation computed on the XGA intensity image over a squared neighborhood (e.g. 16×16 for large-size skin areas, or 8×8 for medium-sized skin areas), but may also take into account other factors (e.g., the skin level of confidence, the proximity of the pixel to face features, such as eyes and mouth etc.)

Initially, $\alpha$ is computed as:

$$\alpha = \frac{\sigma_{skin}}{\sigma_{local}},$$

where $\sigma_{skin}$ is the standard deviation computed over the whole skin area, while $\sigma_{local}$ is the local tan deviation. Then $\alpha$ is limited to 1.

$\alpha$ may be increased by a predefined factor (e.g., 1.1-1.25) for pixels having higher confidence of skin.

$\alpha$ may be decreased by a predefined factor for pixels located in the vicinity of face features, such as eyes and mouth (see FIG. 1). (For eye and mouth detection, see chapter on eye and mouth beautification).

Special attention may be given to pixels located near the skin border. In this example, for those pixels, $\sigma_{local}$ is higher owing to the fact that there is a strong edge in the computing neighborhood. In these cases, the direction of the edge is sought (only the four main directions are considered) and, based on it, the most uniform sub-window of the current window is used for recomputing $\alpha$ and the local average.

$\alpha$ may also modified based on the relationship between the intensity of the current pixel and the local average (computed over the same neighborhood as $\sigma_{local}$). This is because face artifacts that are attempted to be eliminated by face beautification (e.g, freckles, pimples, wrinkles) may be typically darker than skin, but not very dark.

In one embodiment, the following modification may be performed: if the current intensity is greater than the local average, decrease $\alpha$ (high intensity, therefore, strongly reduce correction). If the current intensity is much lower than the local average, decrease $\alpha$ (too dark to be a face artifact, strongly reduce correction). If the current intensity is lower than the local average, but the difference between the two is small, increase $\alpha$ (very likely face artifact, therefore increase correction). If the current intensity is lower than the local average, and the difference between them is important, slightly decrease $\alpha$ (less likely to be a face artifact, therefore slightly reduce correction).

Apply correction on the intensity value, based on the relation:

$$\text{NewIntensity}=\alpha\cdot\text{LocalAverage}+(1-\alpha)\cdot\text{OldIntensity}$$

The averaging may be computed on the same intensity image used for the weighting map (XGA image). This improves speed without affecting quality.

FIGS. 2A-2C illustrates an example of working with detected features. In FIG. 2A, input and predetermined data are illustrated with colors including cyan (blue-ish hue) for the face rectangle, green for face features such as eye and mouth or lips, and red for skin inside the face area.

FIG. 2B illustrates an initial image, and FIG. 2C illustrates an output result using auto face beautification.

Enhancement of Facial Features (Eyes and Mouth)

Besides removing skin artifacts (wrinkles, pimples etc.), eyes and mouth beautification may be applied as well towards an overall better visual aspect of the face. The following actions may be taken for eye and mouth beautification.

Initial locations of eyes and mouth may be (coarsely) determined as the largest holes in the PCA skin map located in the upper left, upper right and lower half parts of the face rectangle or other shape.

More precise eye and mouth localization may be performed at a higher resolution (XGA at least) in a small neighborhood surrounding the initial areas described above, as follows:

A mouth area may be detected based on color information. When using YUV color space, it may be defined as the area which has the V component higher than a threshold (computed based on the local V histogram).

The presence of teeth may be checked by inspecting the histogram of saturation S inside the smallest rectangle surrounding the mouth area. If working in YUV color space, saturation may be computed as S=abs(U)+abs(V). If the histogram of saturation is unimodal, then teeth might not be visible. If the histogram of saturations is bimodal, then the area corresponding to the inferior mode of the histogram may be inspected. If this area is found to be located inside the mouth area (more precisely, if a sandwich mouth-teeth-mouth is present), then it may be decided that teeth are visible.

One or both eye areas may be detected each as a connected area that has the normalized Y·S component lower than a threshold (computed based on the local Y·S histogram). In the above expression, Y is the normalized intensity component from the YUV color space, whereas S is the normalized saturation, computed as above. Normalization of both Y and S may be done with respect to the local maximum values.

The iris may be detected as the central, darker part of the eye, whereas sclera (eye white) may be detected as the remaining part of the eye.

Mouth and eye beautification may include any one or more or all of the following steps, not necessarily in the order described:

The mouth redness may be increased. In YUV color space this may be done by multiplying the V value inside the mouth area by a predefined factor (e.g., 1.2).

The teeth may be whitened by slightly increasing the Y component while reducing the absolute value of U and V components.

The eye white may be brightened and whitened, by slightly increasing the Y component while reducing the absolute value of U and V components inside the eye white area.

The iris may be improved by stretching the intensity contrast inside the iris area. Also, if the red eye phenomenon is present (which results in an increased V value of the pupil area located inside the iris), a red eye correction algorithm may be applied, as may a golden eye algorithm (see, e.g., U.S. Pat. Nos. 6,407,777, 7,042,505, 7,474,341, 7,436,998, 7,352,394, 7,336,821 and 7,536,036, which are incorporated by reference).

In accordance with several embodiments, the quality of portrait images may be improved by doing face, skin and/or face feature enhancement.

Alternative Embodiments

Certain embodiments benefit very advantageously when provided on digital camera and especially on a handheld camera-equipped device. Using specific data from a face detector, or even a face tracker (with data from multiple image frames) can permit the method to perform advantageously. In one embodiment, an enhanced face image may be acquired dynamically from a face tracker module. The use of a PCA to determine main skin color can be advantageous, as well as using the two other color space dimensions to determine variation from that color. The method may include decorrelating the color space into "primary skin" and "secondary skin". The use of the "secondary skin" dimensions to determine "good skin" can be advantageous for skin detection as well. A smaller image may be used for the detection, while the localized smoothing kernel(s) may be applied to the full image, thereby saving valuable processing resources to great advantage on a handheld device. Two skin maps may be used, including an "exclusive" one combined with an "inclusive" one, and face detection data may also be utilized. Many "skin analysis" and tone/color/contrast and other image adjustment techniques may be combined with embodiments described herein, e.g. as described at US published application no. 2006/0204110, which is incorporated by reference. Skin and facial feature detection (eyes, mouth) is advantageously used in facial image enhancement, which may include smoothing, blur, texture modification, noise reduction/enhancement, or other technique for reducing a visual effect of a blemish or blemished region of a face. Wrinkle correction may be effected within certain embodiments.

In addition, PCA-based "strong" skin detection may be advantageously utilized, which enables detection of only those skin tones which are similar to those of the face, and may be used to discard other skin-like patches whose color is yet different from that of the skin (e.g., a wall behind, light hair, etc.).

The embodiments described herein utilize application of selective smoothing which is not to all skin pixels of the face, but only to those which are likely to be or include artifacts (e.g., wrinkles, pimples, freckles etc.). This is very different from global solutions where all facial skin pixels or the entire face are smoothed and facial non-skin pixels (e.g. mouth, eyes, eyebrows) are sharpened. These embodiments serve to preserve intrinsic skin textures, while removing unwanted artifacts. For instance, a person's will look their age, thus remaining natural, while still improving the appearance of the face.

Age Classification

In another embodiment, a processor-based digital image acquisition device is provided, e.g., with a lens and image sensor, a processor and code for programming the processor to perform a method of enhancing acquisition parameters of a digital image as part of an image capture process using face detection within said captured image to achieve one or more desired image acquisition parameters. Multiple groups of pixels that correspond to a face within a digitally-acquired reference image are identified. Values are determined of one or more attributes of the face. One or more default image attribute values are compared with one or more of the determined values. The face is classified according to its age based on the comparing of the image attribute values. A camera acquisition parameter is adjusted based on the classifying of the face according to its age. A main image is captured in accordance with the adjusting of the camera acquisition parameter.

The process may also include generating in-camera, capturing or otherwise obtaining in-camera a collection of low resolution images including the face, and tracking said face within said collection of low resolution images. The identifying of face pixels may be automatically performed by an image processing apparatus. Automated processing of the face pixels may be performed based on the classifying.

The camera acquisition parameter may include exposure. The age of the face may be classified as that of a child, baby, youth, adult, elderly person, and/or may be determined based on recognition of a particular face. The adjusting of the camera acquisition parameter may include reducing exposure. Fill-flash may be applied to the face in post-processing. The adjusting of camera acquisition parameter may include optimizing focus on a baby's or child's or youth's face, centering the face, increasing the size of the face, cropping around the face, adjusting the orientation or color of the face, or combinations thereof, and/or may involve increasing the resolution and/or reducing the compression of pixels of the face of the baby or child or other classification of face.

The face may be tracked over a sequence of images.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference: U.S. Pat. Nos. 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 5,781,650, 7,362,368 and 5,978,519; and U.S. published application nos. 2005/0041121, 2007/0110305, 2006/0204110, PCT/US2006/021393, 2005/0068452, 2006/0120599, 2006/0098890, 2006/0140455, 2006/0285754, 2008/0031498, 2007/0147820, 2007/0189748, 2008/0037840, 2007/0269108, 2007/0201724, 2002/0081003, 2003/0198384, 2006/0276698, 2004/0080631, 2008/0106615, 2006/0077261 and 2007/0071347; and U.S. patent applications Ser. Nos. 10/764,339, 11/573,713, 11/462,035, 12/042,335, 12/063,089, 11/761,647, 11/753,098, 12/038,777, 12/043,025, 11/752,925, 11/767,412, 11/624,683, 60/829,127, 12/042,104, 11/856,721, 11/936,085, 12/142,773, 60/914,962, 12/038,147, 11/861,257, 12/026,484, 11/861,854, 61/024,551, 61/019,370, 61/023,946, 61/024,508, 61/023,774, 61/023,855, 61/221,467, 61/221,425, 61/221,417, 61/182,625, 61/221,455, 11/319,766, 11/673,560, 12/485,316, 12/479,658, 12/479,593, 12/362,399, and 12/302,493.

What is claimed is:

1. A method of enhancing an appearance of a face within a digital image, comprising using a processor in:

acquiring a digital image of a scene including a depiction of a face, including capturing the image using a lens and an image sensor, or receiving said image following capture by a device that includes a lens and an image sensor, or a combination thereof;

identifying a face region, wherein the face region is a region of the digital image that includes the depiction of the face;

wherein the face region includes less than all of said digital image;

identifying within the face region one or more sub-regions to be enhanced with localized luminance smoothing;

wherein each of the one or more sub-regions includes less than all of said face region;

applying one or more localized luminance smoothing kernels each to one of the one or more sub-regions identified within the face region to produce one or more enhanced sub-regions within the face region, wherein the applying comprises applying the one or more localized luminance smoothing kernels to luminance data of the one or more sub-regions identified within said face region;

wherein the step of applying one or more localized smoothing kernels further comprises applying, to each particular sub-region of the one or more sub-regions, a localized smoothing kernel configured based, at least in part, on an average luminance around a point of interest for that particular sub-region;

generating an enhanced image including an enhanced version of the face region comprising certain original or otherwise processed pixels in combination with pixels corresponding to the one or more enhanced sub-regions within the face region; and displaying, transmitting, communicating or digitally storing or otherwise outputting the enhanced image or a further processed version, or combinations thereof.

2. The method of claim 1, wherein the localized luminance smoothing comprises blurring or averaging luminance data, or a combination thereof.

3. The method of claim 1, further comprising applying one or more localized color smoothing kernels to the one or more sub-regions, and wherein the one or more enhanced sub-regions of the enhanced image further comprise pixels modified from original pixels of the face at least by localized color smoothing.

4. The method of claim 1, further comprising applying noise reduction or enhancement, or both, to the one or more sub-regions, and wherein the one or more enhanced sub-regions of the enhanced image further comprise pixels modified from original pixels of the face at least by localized noise reduction or enhancement, or both.

5. The method of claim 1, wherein enhanced pixels of the one or more enhanced sub-regions comprise enhanced intensities which comprise one or more functions of a relationship between original pixel intensities and local average intensities within the one or more original or enhanced sub-regions, or combinations thereof.

6. The method of claim 1, further comprising detecting one or more mouth or eye regions, or combinations thereof, within the face, and identifying and enhancing a natural color of one or more sub-regions within the one or more mouth or eye regions, including one or more teeth, lips, tongues, eye whites, eye brows, iris's, eye lashes, or pupils, or combinations thereof.

7. A device including a lens, an image sensor, a processor, and a processor-readable medium having code embedded therein for programming the processor to perform a method of enhancing an appearance of a face within a digital image, wherein the method comprises:

acquiring a digital image of a scene including a depiction of a face, including capturing the image using a lens and an image sensor, or receiving said image following capture by a device that includes a lens and an image sensor, or a combination thereof;

identifying a face region, wherein the face region is a region of the digital image that includes the depiction of the face;

wherein the face region includes less than all of said digital image;

identifying within the face region one or more sub-regions to be enhanced with localized luminance smoothing;

wherein each of the one or more sub-regions includes less than all of said face region;

applying one or more localized luminance smoothing kernels each to one of the one or more sub-regions identified within the face region to produce one or more enhanced sub-regions within the face region, wherein the applying comprises applying the one or more localized luminance smoothing kernels to luminance data of the one or more sub-regions identified within said face region;

wherein the step of applying one or more localized smoothing kernels further comprises applying, to each particular sub-region of the one or more sub-regions, a localized smoothing kernel configured based, at least in part, on an average luminance around a point of interest for that particular sub-region;

generating an enhanced image including an enhanced version of the face region comprising certain original or otherwise processed pixels in combination with pixels corresponding to the one or more enhanced sub-regions within the face region; and displaying, transmitting, communicating or digitally storing or otherwise outputting the enhanced image or a further processed version, or combinations thereof.

8. The device of claim 7, wherein the localized luminance smoothing comprises blurring or averaging luminance data, or a combination thereof.

9. The device of claim 7, further comprising applying one or more localized color smoothing kernels to the one or more sub-regions, and wherein the one or more enhanced sub-regions of the enhanced image further comprise pixels modified from original pixels of the face at least by localized color smoothing.

10. The device of claim 7, further comprising applying noise reduction or enhancement, or both, to the one or more sub-regions, and wherein the one or more enhanced sub-regions of the enhanced image further comprise pixels modified from original pixels of the face at least by localized noise reduction or enhancement, or both.

11. The device of claim 7, wherein enhanced pixels of the one or more enhanced sub-regions comprise enhanced intensities which comprise one or more functions of a relationship between original pixel intensities and local average intensities within the one or more original or enhanced sub-regions, or combinations thereof.

12. The device of claim 7, wherein the method further comprises detecting one or more mouth or eye regions, or combinations thereof, within the face, and identifying and enhancing a natural color of one or more sub-regions within the one or more mouth or eye regions, including one or more teeth, lips, tongues, eye whites, eye brows, iris's, eye lashes, or pupils, or combinations thereof.

13. One or more non-transitory computer readable media having code embedded therein for programming a processor to perform a method of enhancing an appearance of a face within a digital image of a scene including a depiction of a face captured with a lens and an image sensor, or received following capture by a device that includes a lens and an image sensor, or a combination thereof; wherein the method comprises:

identifying a face region, wherein the face region is a region of the digital image that includes the depiction of the face;

wherein the face region includes less than all of said digital image;

identifying within the face region one or more sub-regions to be enhanced with localized luminance smoothing;

wherein each of the one or more sub-regions includes less than all of said face region;

applying one or more localized luminance smoothing kernels each to one of the one or more sub-regions identified within the face region to produce one or more enhanced sub-regions within the face region, wherein the applying comprises applying the one or more localized luminance smoothing kernels to luminance data of the one or more sub-regions identified within said face region;

wherein the step of applying one or more localized smoothing kernels further comprises applying, to each particular sub-region of the one or more sub-regions, a localized smoothing kernel configured based, at least in part, on an average luminance around a point of interest for that particular sub-region;

generating an enhanced image including an enhanced version of the face region comprising certain original or otherwise processed pixels in combination with pixels corresponding to the one or more enhanced sub-regions within the face region; and displaying, transmitting, communicating or digitally storing or otherwise outputting the enhanced image or a further processed version, or combinations thereof.

14. The one or more non-transitory computer readable media of claim 13, wherein the localized luminance smoothing comprises blurring or averaging luminance data, or a combination thereof.

15. The one or more non-transitory computer readable media of claim 13, wherein the method further comprises applying one or more localized color smoothing kernels to the one or more sub-regions, and wherein the one or more enhanced sub-regions of the enhanced image further comprise pixels modified from original pixels of the face at least by localized color smoothing.

16. The one or more non-transitory computer readable media of claim 13, wherein the method further comprises applying noise reduction or enhancement, or both, to the one or more sub-regions, and wherein the one or more enhanced sub-regions of the enhanced image further comprise pixels modified from original pixels of the face at least by localized noise reduction or enhancement, or both.

17. The one or more non-transitory computer readable media of claim 13, wherein enhanced pixels of the one or more enhanced sub-regions comprise enhanced intensities which comprise one or more functions of a relationship between original pixel intensities and local average intensities within the one or more original or enhanced sub-regions, or combinations thereof.

18. The one or more non-transitory computer readable media of claim 13, wherein the method further comprises detecting one or more mouth or eye regions, or combinations thereof, within the face, and identifying and enhancing a natural color of one or more sub-regions within the one or more mouth or eye regions, including one or more teeth, lips, tongues, eye whites, eye brows, iris's, eye lashes, or pupils, or combinations thereof.

* * * * *